April 3, 1934.  J. W. EGGLESON  1,953,878
NUT CRACKER
Filed Aug. 8, 1932
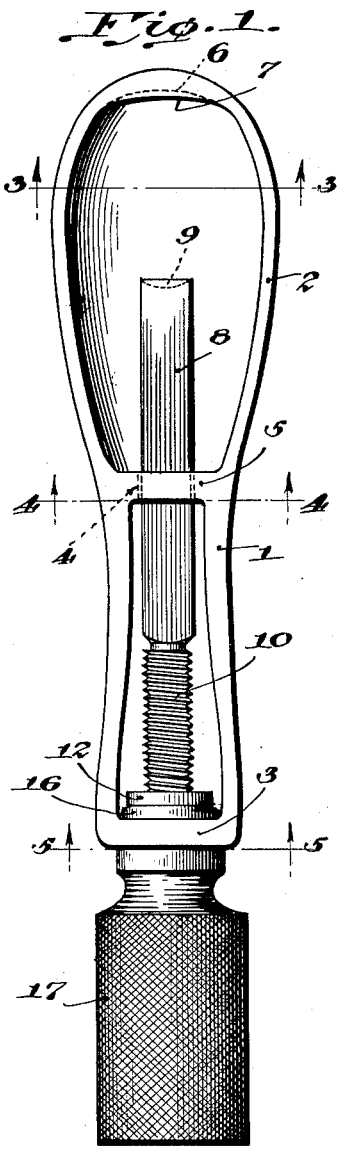
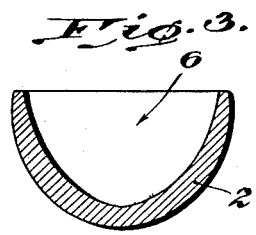
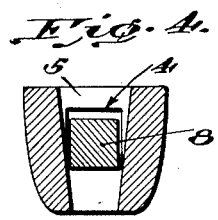
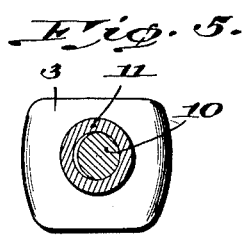
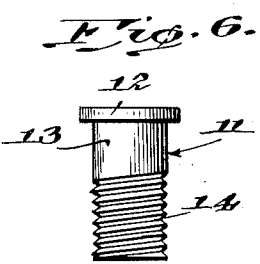
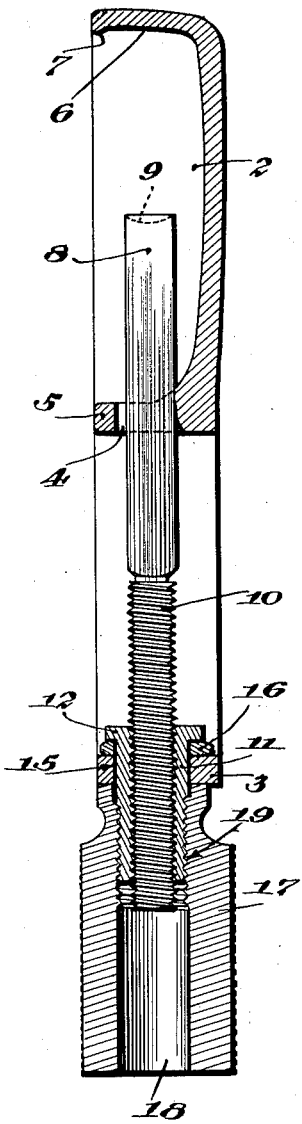
WITNESSES
INVENTOR
J. W. Eggleson,
BY
ATTORNEY Patented Apr. 3, 1934

1,953,878

UNITED STATES PATENT OFFICE 1,953,878

NUT CRACKER

Joseph W. Eggleson, Davenport, Iowa

Application August 8, 1932, Serial No. 627,952

2 Claims. (Cl. 146—16)

This invention relates to improvements in nut crackers, and its objects are as follows:—

First, to provide the frame of the stationary jaw with a square or other non-circular hole to receive the cross sectionally similar plunger, this interconnection confining the plunger to rectilinear movements.

Second, to provide a novel form of swivel for said plunger, particularly avoiding the need of cutting threads in the frame.

Third, to provide a hollow handle for actuating the plunger, said handle receiving the threaded shank of the plunger and fully covering the extending end of the shank so that the user's hand never comes in contact therewith and is consequently prevented from soiling by the oil.

Fourth, to provide a bowl shaped to fit the hand, enabling the fingers to close over the nut being cracked to prevent the shell from flying or scattering.

Fifth, to particularly shape the anvils so as to crack nuts without breaking the kernels.

Other objects and advantages will appear in the following specification, reference being had to the accompanying drawing in which Figure 1 is a plan view of the improved nut cracker.

Figure 2 is a central longitudinal section.

Figure 3 is a cross section taken on the line 3—3 of Figure 1.

Figure 4 is a cross section taken on the line 4—4 of Figure 1.

Figure 5 is a cross section taken on the line 5—5 of Figure 1.

Figure 6 is a detail elevation of a nut which forms the main part of the swivel.

In carrying out the invention provision is made of a frame 1 which is shaped into a bowl 2 at one end and into a wall 3 at the other end. The medial portion of the frame is formed to provide a square or non-circular hole 4 (Fig. 4), the top closure of this hole consisting of a bridge 5 the top of which is flush with the top of the frame.

The bowl 2 comprises the stationary jaw of the nut cracker, and it is into the bowl that the nut to be cracked is inserted. One end of the nut abuts an anvil 6. This is an almost plane wall. It has a slight but perceptible lip 7 (Fig. 2) which aids in keeping that end of the nut down against the anvil 6.

A plunger 8 is adapted to be worked back and forth in the longitudinal direction of the bowl 2. The plunger is cross sectionally square to suit the shape of the hole 4. The plunger substantially fits the hole, although it works in it loosely and it is prevented from turning with reference to the bowl and is therefore limited to rectilinear movements.

That end of the plunger within the bowl 2 has a cavity 9 providing an anvil confronting the anvil 6. The cavity is rather shallow, but it is deep enough to obtain a good hold of the nut when the plunger is moved inwardly against it under pressure. The particular shape of the anvils 6, 9 enables the immediate exercise of pressure against the shell of the nut so that the shell will be expanded and cracked without breaking the kernels.

A shank 10 integral with the plunger 8, is provided with a left hand thread. This shank screws into the threaded bore of a swivel nut 11 (Figs. 2 and 6). This nut has a flange 12, an adjacent cylindrical portion 13 and a portion 14 provided with right hand threads. The cylindrical portion 13 is revoluble in a smooth round hole 15 in the wall 3. The flange 12 abuts an interposed washer 16.

The hollow rotary handle 17 has a bore 18 (making it hollow) which is threaded at 19 a part of the distance. This has a right hand thread, and the threaded portion 14 of the nut is screwed into it. The nut is screwed in tight, and the arrangement of the threads is such that there will be sufficient loose play between the swivel nut and its attached handle 17 and the wall 3 to enable absolutely free turning of the handle.

It is this turning of the handle which actuates the plunger 8 back and forth. The shank 10 either disappears into the hollow handle 17 or is projected therefrom as shown in Figure 2, and when it disappears into the handle the extending end will be covered by the handle so that the user will never come in contact with it, thereby being protected from being soiled by the oil which can be freely applied.

In assembling parts of the nut cracker, the plunger 8 is introduced into the hole 4 from beneath, the plunger being thrust into the bowl 2. The swivel nut 11 with its washer 14 is inserted through the hole 15 from the inside of the frame 1. The shank 10 may then either be brought up and screwed into the swivel nut 11 by turning the latter counter-clockwise, or one may hold the flange 12 with the fingers of the left hand while screwing the handle 17 on counter-clockwise with the other hand until the threads bind. The threads are made to bind at a time to insure loose play of the swivel on the wall 3. Upon then introducing the shank 10 to the swivel nut 11, a counter-clockwise turn of the handle will feed the shank 10 into and through the nut 11.

It is to be observed that the bowl 2 has a generally oval shape (Figs. 1 and 3). This shape fits the hand so well as to enable closing the fingers over the nut to hold the nut in the bowl and prevent the fragments from flying or scattering. Holding the bowl 2 in this manner the handle 17 is turned clockwise to urge the plunger 8 against the adjacent end of the nut.

I claim:—

1. A nut cracker comprising a frame having a bowl at one end, a plunger having an anvil end movable back and forth in the bowl, said plunger being cross sectionally square, means for moving the plunger, and a formation on the frame substantially similar in shape to the cross section of the plunger, receiving the plunger and constraining it to rectilinear movements.

2. A nut cracker comprising a frame having a bowl at one end, a wall at the opposite end and an intermediate bridge, said bridge having a non-circular opening, a one-piece plunger mounted on the frame comprising a portion slidably fitted in the opening and being of a corresponding non-circular shape and another portion screw threaded from end to end, a handle bearing on one side of the wall by which the plunger is reciprocated and swivel means for turnably attaching the handle to the wall, said means comprising a nut affixed to the handle going through the wall and threadedly receiving the threaded portion of the plunger, and a flange bearing on the opposite side of the wall.

JOSEPH W. EGGLESON.